Jan. 22, 1957 S. A. SCHERBATSKOY 2,778,947
AUTOMATIC PROPORTIONAL COUNTER
Filed May 17, 1951 4 Sheets-Sheet 1

INVENTOR.
Serge A Scherbatskoy

Jan. 22, 1957

S. A. SCHERBATSKOY 2,778,947

AUTOMATIC PROPORTIONAL COUNTER

Filed May 17, 1951

INVENTOR.

Serge A Scherbatskoy

FIG. 3

Jan. 22, 1957 S. A. SCHERBATSKOY 2,778,947
AUTOMATIC PROPORTIONAL COUNTER
Filed May 17, 1951 4 Sheets-Sheet 4

INVENTOR.
Serge A. Scherbatskoy

United States Patent Office 2,778,947
Patented Jan. 22, 1957

2,778,947
AUTOMATIC PROPORTIONAL COUNTER

Serge A. Scherbatskoy, Tulsa, Okla.

Application May 17, 1951, Serial No. 226,874

The terminal portion of the term of the patent subsequent to August 4, 1970, has been disclaimed 16 Claims. (Cl. 250—71)

This application is a continuation-in-part of the U. S. patent application Serial No. 119,601, now Patent No. 2,648,012, filed by Serge A. Scherbatskoy.

My invention relates to radiation detecting devices and more particularly to a device of the counter type for separately detecting and measuring various components of heterogeneous radiation such as a mixture of gamma rays and neutrons, or, for instance, separately detecting particles of various energies comprised in the same radiating beam.

The radiation counter operates by the production of an electrical discharge in a gas. The counter is extremely sensitive and a discharge may be produced when a single ion pair is produced almost anywhere in the tube. It is extremely difficult to assure that a counter even very carefully made to any specification will be satisfactory in all respects. The extreme sensitivity of the counter renders it liable to drifts and spontaneous discharges, the origin of which is uncertain. Furthermore, the characteristics of the discharge are also often found to change with time, temperature, and exposure to radiation and other effects.

It is the purpose of my invention to compensate for drifts in a radiation counter and to provide an automatic controlling arrangement that will insure the stability of operation of the device.

It is another object of my invention to compensate for drifts in a proportional counter for measuring neutrons in presence of gamma rays and to provide an arrangement for automatically adjusting an appropriate threshold device in order to render said threshold device constantly effective in separating neutron impulses from gamma ray impulses.

It is another object of my invention to selectively receive various components of a beam of heterogeneous radiations, said beam comprising, for instance, particles such as protons, having various energies.

A particularly important feature of the present invention consists in compensating the variation in sensitivity of scintillation counters to the temperature effects. This problem is of a particular importance in well logging where the vertical temperature gradient of a drill hole makes it often impossible to obtain a satisfactory log.

Other objects, together with some of the advantages to be derived in utilizing the present invention, will become apparent from the following detailed description, taken together with the accompanying drawings, wherein.

It is well known that neutrons are usually detected in presence of gamma rays and we employ for their detection proportional radiation counters, i. e. those in which the electrical discharge is dependent on primary ionization as distinguished from a counter of the Geiger-Mueller type which is independent of primary ionization.

A proportional radiation counter may be so adapted that it is sensitive to neutrons. However, proportional radiation counters are also sensitive to gamma rays, and it is the purpose of the instant invention to provide a neutron detecting device including a proportional counter and having superior qualities in the detection of neutrons while minimizing the effect of gamma rays. Since most sources of neutrons also emit gamma rays, such selective detection of neutrons is important.

It is well known that a borontrifluoride filled or boron-lined counter can detect neutrons. Each registered neutron produces a voltage impulse at the output of the counter circuit and this voltage impulse, under proper operating conditions, is substantially larger than the voltage impulses produced by registration of gamma rays. The usual arrangement comprises a threshold circuit which responds only to the larger impulses (neutrons) and is irresponsive to the smaller impulses (gamma rays).

Because of the instability of the counter the above arrangement is not always very satisfactory, i. e. the neutron impulses and gamma impulses can vary so that under certain conditions the neutron impulses may become too small to pass the threshold device or the gamma impulses may become so large that they will pass the threshold device and interfere with the recording of neutron pulses.

Figure 1:
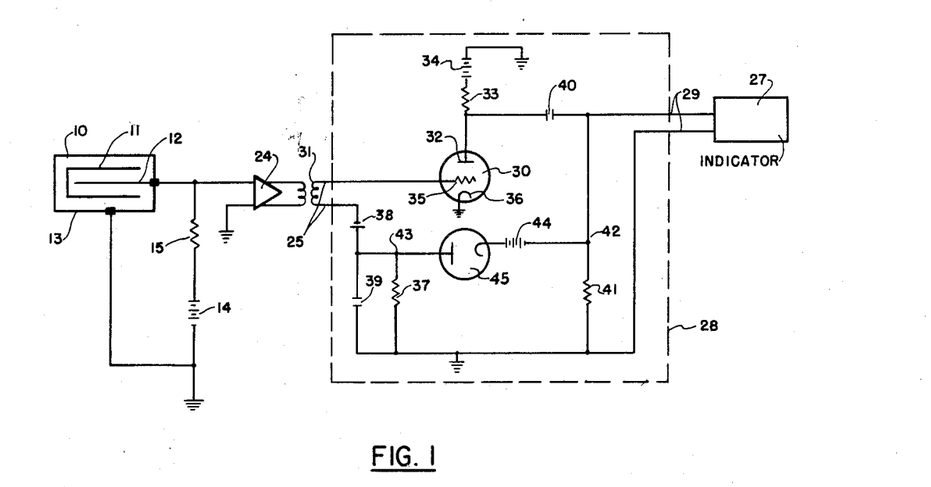
Fig. 1 shows diagrammatically automatic circuit for measuring neutrons in presence of gamma rays by means of a control circuit for automatically varying the characteristics of the threshold device in response to the departure of the counter from normal operating conditions.

Referring now more specifically to Fig. 1, numeral 10 designates a proportional counter. The proportional counter comprises a cathode 11, usually a thin walled metal tube, and an anode 12, usually a thin wire passing through and insulated from the tube that forms the cathode. Anode and cathode are enclosed in an envelope 13, for example a glass bulb, which contains a suitable gas, say methane, at relatively low pressure. The anode is maintained at a positive potential with respect to the cathode by means of a battery 14 in series with a resistor 15. If a particle capable of ionizing the gas passes into the counter, it will "trigger" with a resultant flow of current of the order of a few microamperes. This causes a large voltage drop across the resistance so that the discharge ceases after a short period of time. When the discharge ceases, the counter is again in condition to register the passage of an ionizing particle.

Neutrons, per se, do not cause ionization within the counter. Consequently, in order to detect neutrons with a proportional counter, it is necessary to utilize an intermediate reaction by which the neutron releases an ionizing particle, say an alpha particle, which in turn acts on the gas within the counter. Such reactions are known to occur when a neutron strikes lithium or boron, and a proportional counter can be made sensitive to neutrons by lining the wall of the counter with one or more of those elements or their compounds. Similarly, the envelope of the counter can be filled with a gas containing a compound of lithium or boron, say borontrifluoride.

As indicated above, the action of the neutron upon the lithium or boron brings about the emission of mostly alpha particles. Gamma rays, on the other hand, release electrons within the counter. The specific ionization of alpha rays is much greater than that of electrons, so that the maximum charge pulses in a proportional counter due to neutrons are much larger than those due to gamma rays.

The pulses derived from the proportional counter are transmitted through a conventional preamplifier 24 and transformer 31 to the input of the threshold device comprised within the block 28. The purpose of the threshold device is to eliminate the small impulses due to gamma rays and to transmit to the indicator 27 only large impulses due to neutrons.

We obtain thus across the output terminals 25 of the transformer 31 two types of voltage impulses; the impulses of large magnitude having $E_n$ volts which originate from the passage of neutrons and the impulses of small magnitude having $E\gamma$ volts which originate from the passage of a gamma ray. It is our desire to transmit to the indicator 27 only the neutron impulses $E_n$ since the gamma impulses $E\gamma$ provide the undesirable background that usually interferes with the recording neutrons. The threshold device 28 is characterized by a certain value $E_t$ designated as "threshold voltage" and arranged in such a manner that $E\gamma < E_t < E_n$. Only those impulses that exceed the value $E_t$, i. e. the neutron impulses $E_n$ are transmitted through the threshold device to the indicator 27. The impulses that are smaller than $E_t$, i. e. the gamma impulses $E\gamma$ are stopped by the threshold device and consequently they do not appear at all at the indicator 27.

It is, however, well known that because of conditions beyond our control the characteristic of the radiation counter undergoes erratic changes. It may therefore happen that both neutron and gamma impulses decrease in magnitude to values below the threshold voltage $E_T$ and in such a case the indicator 27 does not show any counts. It may also happen that both neutron and gamma impulses increase in magnitude to values that are above the threshold voltage $E_t$ and in such case the indicator 27 shows both the neutron counts and the gamma ray counts. In order to obviate this inconvenience, the threshold device 28 is provided with a variable threshold voltage $E_T$. The variation of $E_T$ will always follow the variation of neutron impulses and gamma impulses and will always be such that $E_n > E_t$ and $E\gamma < E_t$, i. e. the threshold device will always pass the neutron impulses and stop the gamma impulses.

The threshold device 28 comprises a triode 30 having its grid circuit connected to the input terminals 25 and having its anode 32 connected through resistor 33 to a voltage source 34. The grid 35 is connected to the filament 36 by means of a circuit comprising the secondary winding of the transformer 31 in series with a condenser-resistor element, said element consisting of a resistor 37 and battery 38, both shunted by a condenser 39. The plate 32 is connected to the filament 36 by means of a condenser 40 in series with a resistor 41. The terminal 42 of the resistor 41 is connected to the terminal 43 of the resistor 37 by means of a battery 44 in series with a rectifier 45. The terminals of the resistor 41 are connected through the leads 29 to the indicator 27.

The operation of the device is as follows:

The counter 10 is assumed to be exposed to a stream of neutrons accompanied by a background of gamma rays. We obtain therefore across the leads 25 a succession of impulses, some of which are neutron impulses of relatively large magnitude $E_n$ and the other are gamma impulses of relatively small magnitude $E\gamma$. These impulses are applied to the grid 35 of the triode 30.

Figure 2A:
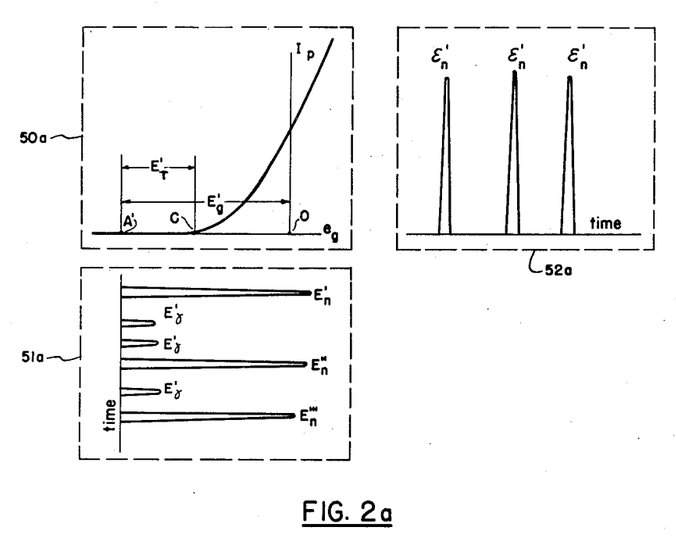
Fig. 2a, 2b, 2c illustrates the operation of the threshold device for various settings of the grid bias.

We assume that the triode 30 is under normal operating conditions as illustrated in Fig. 2a. Fig. 2a shows three diagrams that are separately enclosed within the dotted rectangles 50a, 51a, and 52a, respectively.

The diagram within 50a shows the plate current grid voltage characteristic of the tube. The abscissa represents the voltage $e_g$ applied to the grid 35 and the ordinate represents the corresponding current $I_p$ flowing in the plate circuit of the triode through the resistor 41. The point O represents the origin of coordinates. Of particular significance in this diagram is the point C representing the cut off potential and the point A' representing the grid bias. The magnitude of the grid bias $E'_g$ is represented by the segment A'O and the magnitude of the threshold potential $E'_t$ is represented by the segment A'C. It is apparent that the voltage impulses applied across the input terminals 25 are superimposed upon the grid bias. Consequently, if these impulses are less than $E_t$ they are below the cut off potential and conversely, if they are more than $E'_t$ they are above the cut off potential.

The diagram enclosed within the dotted rectangle 51a represents the succession of impulses derived from the terminals 25 and applied to the grid 35 of the triode. The vertical axis of coordinates represents time and since these impulses are superimposed upon the grid bias $E'_g$ of the tube, the time axis has been drawn at a distance $E'_g$ to the left of the point O. The impulses that are applied to the grid are either the relatively large neutron impulses designated as $E'_n$ or relatively small gamma ray impulses designated as $E'\gamma$. The grid bias $E'_g$ has been so chosen that the gamma impulses $E'\gamma$ are below the cut-off point C and therefore do not produce any plate current at all, i. e. $I_p = O$. On the other hand, however, the neutron impulses $E'_n$ are above the cut off point C. Therefore, they fall within the portion of the triode characteristic curve to which there corresponds a substantial plate current $I_p$. Consequently, the pulses $E'_n$ that are superimposed upon the grid bias $E'_g$ produce in the output of the triode corresponding amplifier pulses $\epsilon'_n$.

The diagram enclosed within the dotted line 52a shows the voltage impulses across the resistor 41. The horizontal line represents the time axis. The impulses $\epsilon'_n$ correspond to the neutron impulses $E'_n$ applied to the grid. Since the gamma impulses $E'\gamma$ are below the cut off value they do not produce any corresponding impulses across the resistor 41, and are therefore not shown in 52a.

It is thus apparent that the tube 30 acts as a gate and transmits only the neutron impulses which are subsequently applied to the indicator 27. The gamma impulses are not transmitted through the gate and therefore do not interfere with the useful indications.

It is apparent that in order to maintain the conditions as illustrated in Fig. 2a, we need to maintain the grid bias at a specific value $E'_g$. Furthermore, it is important to consider in that connection that the value $E'_g$ depends and is determined by the magnitude $E'_n$ of the neutron impulses. Should the magnitude of the neutron impulses accidentally change, the corresponding magnitude of the grid bias will change too in accordance with a very well defined relationship.

This change in grid bias will occur because the altered pulse magnitude at the plate of tube 30 will produce a change in the rectified D.-C. potential across resistor 37, gated rectifier 45 being operative in all cases to produce a D.-C. potential across resistor 37 approximately equal to the difference between the voltage of battery 44 and the peak magnitude of the pulses at the plate of tube 32.

Figure 2B:
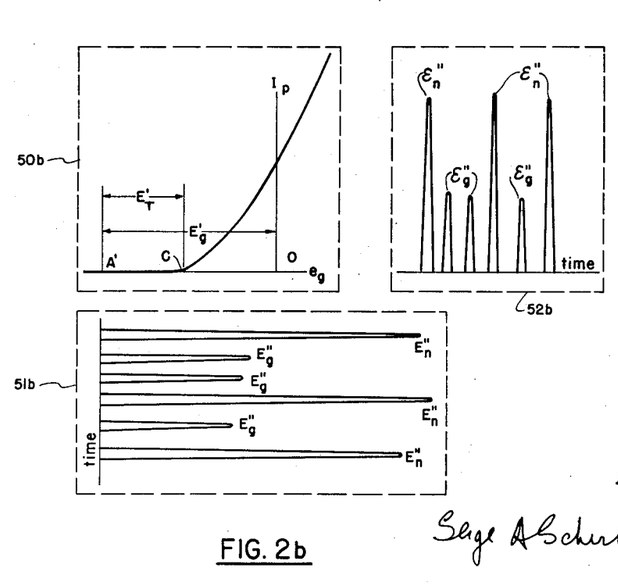

Assume now that because of the changing conditions both neutron and gamma impulses became very much larger. Assume also that the threshold device did not adjust itself to the new conditions and has retained the same threshold potential $E'_t$. Such a situation is illustrated in Fig. 2b that comprises three portions 50b, 51b, 52b, corresponding respectively to 50a, 51a, 52a, of Fig. 2a. The diagrams 50a and 50b are identical since the threshold potentials $E'_t = A'C$ and the grid biases $E'_g = A'O$ are assumed to be the same in both cases. The diagram 51b differs, however, from the diagram 51a since the neutron and gamma impulses $E''_n$, $E''\gamma$ shown in 51b are larger than the neutron and gamma impulses $E'_n$, $E'\gamma$ is shown in 51a. Particularly in Fig. 2b both neutron and gamma impulses exceed the threshold potential, i. e. $E''_n > E''_t$ and $E''_g > E'_t$. Consequently we obtain on the diagram 52b not only the amplified neutron impulses designated as $\epsilon''_n$, but also the amplified gamma impulses designated as $\epsilon''_g$.

It is thus apparent that the threshold element such as shown in Fig. 2a does not discriminate any more between neutron and gamma rays and such an arrangement is therefore undesirable.

Figure 2C:
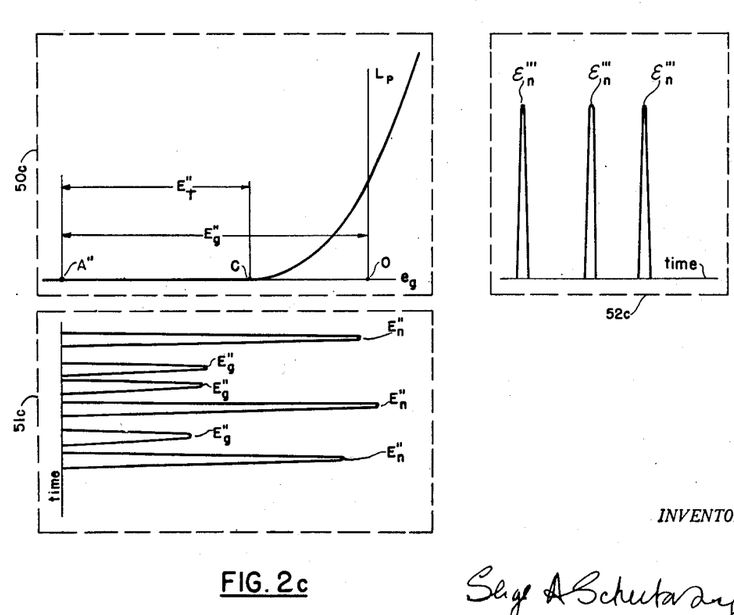

In order to insure a satisfactory operation of the device I have provided a compensating arrangement that is responsive to the increase in the magnitude of the neutron impulses and causes a corresponding shift of the grid bias of the tube 30 in the negative direction to a new value $E''_g$ as shown in Fig. 2c.

Consider now Fig. 2c showing the result of such an automatic adjustment. Fig. 2c comprises three portions 50c, 51c, 52c, corresponding respectively to 50a, 51a, 52a of Fig. 2a. In the diagram 50c the point A' has been shifted to a new position A'' such that A''O represents the new increased grid bias $E''_g$ and A''C represents the new increased value $E''_t$ of the threshold potential. In 51c the neutron impulses $E''_n$ and the gamma impulses $E''_\gamma$ have the same magnitude as in 51b. However, they have been shifted to the left since they are superimposed now on a larger grid bias $E''_g$. It is apparent that in this arrangement the gamma impulses $E''_g$ are below the new threshold $E''_t$ and they do not appear in the plate circuit of the triode. On the other hand, the neutron impulses $E''_n$ exceed the threshold $E''_t$ and appear in the plate circuit as impulses $\epsilon'''_n$.

It is thus apparent that the shift in the grid bias from the previous value $E'_g$ to the new value $E''_g$ has compensated for the increase of the neutron and gamma ray impulses from their previous values $E'_n$, $E'_\gamma$ to the new values $E''_n$, $E''_\gamma$.

Consequently, when the voltage impulses of the counter increase above a certain value, the circuit readjusts itself in such a manner as to cause a corresponding increase upon the negative bias impressed upon the tube 32.

I have provided thus a new method which permits the differentiation between impulses of various magnitudes and at the same time compensate for accidental or uncontrollable factors that cause a variation in the magnitude of said impulse. As an example, the large impulses have been caused by neutrons and small impulses by gamma rays. It is, however, apparent that I can utilize other arrangements. If, for instance, I expose a proportional counter to a stream of protons comprising particles of various energies, I obtain in the output of the counter impulses of various magnitudes, the large magnitudes corresponding to protons of high energy and impulses of small magnitude corresponding to protons of low energy. In such a case I can also utilize the principles of my invention in order to select the neutrons of high energy.

Figure 3:
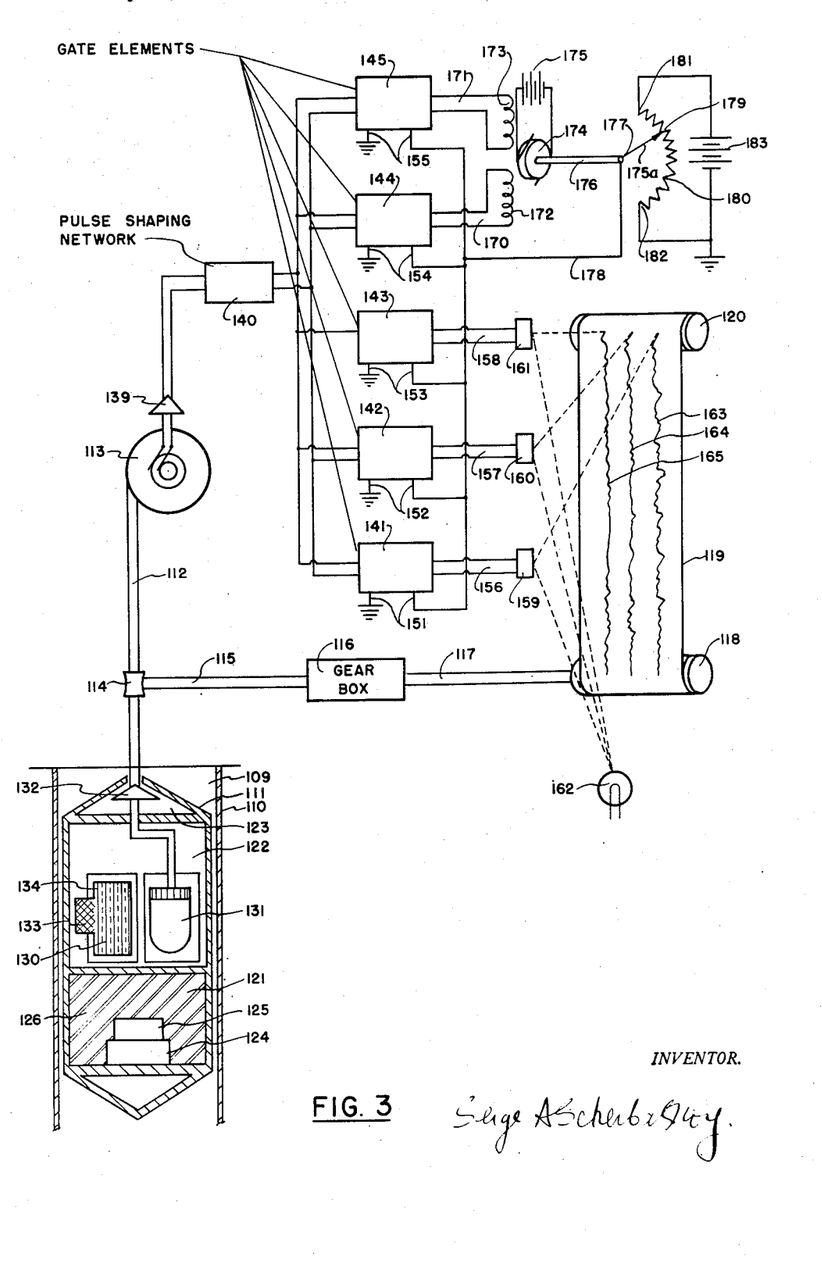
Fig. 3 illustrates diagrammatically a bore hole which penetrates the strata of the earth, and the general arrangement for logging the bore hole in accordance with the principles of the present invention.
Figure 4:
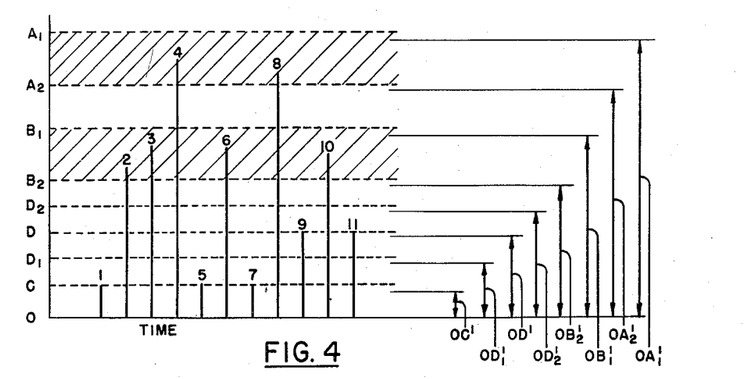
Fig. 4 illustrates diagrammatically current impulses representing various radiations detected in the bore hole.
Figure 5:
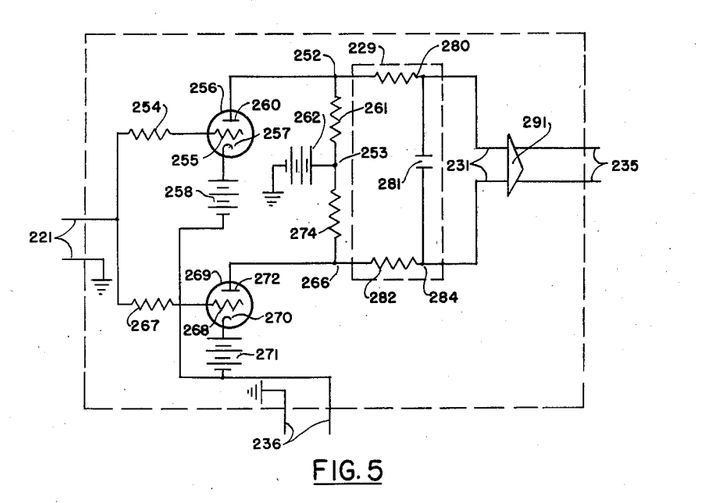
Fig. 5 shows schematically an electric circuit for transmitting impulses within a predetermined band of magnitudes.

Consider now Figs. 3, 4, 5, describing an embodiment of my invention that is particularly applicable in measurements in a bore hole of radiations resulting from nuclear transformations within the formations adjoining said bore hole, said nuclear transformations being caused by an external agent such as a source of neutrons placed adjacent to said formations in the neighborhood of a suitable detecting instrument.

Many measurements have been made of the above radiations. These measurements can be broadly classified in three types that are respectively designated as measurements of gamma radiation, measurements of slow neutrons and measurements of fast neutrons. In the measurements of the first type a detector of gamma radiations accompanied with a source of neutrons has been lowered into a bore hole in the earth and measurements were made at various depths of gamma radiations resulting from interaction of neutrons derived from said source with the adjoining formations. These measurements when correlated with depth provided a log commonly designated as neutron-gamma ray log. In the measurements of the second type a detector of slow neutrons accompanied with a source of neutrons has been lowered into a bore hole and the measurements obtained when correlated with depth provided a log commonly designated as neutron-slow neutron log. In the measurements of the third type a detector of fast neutrons accompanied with a source of neutrons may be lowered into a bore hole and the measurements obtained when correlated with depth will provide a log that we shall designate as neutron-fast neutron log.

In order to obtain a neutron-gamma ray log and a neutron-slow neutron log of the same bore hole, two separate instrumental arrangements were required, one utilizing a gamma ray detector and the other utilizing a slow neutron detector. Neutron-fast neutron logs have not been known in the prior art because of the failure to measure the fast neutrons without the background of gamma radiation.

Referring now to Fig. 3, there is schematically illustrated a drill hole 109 penetrating the formations to be explored. The drill hole is defined in the conventional manner by a tubular metallic casing designated by 110. For the purpose of exploring the formations along the bore hole there is provided in accordance with the present invention exploratory apparatus comprising a housing 111 which is lowered into the bore hole 109 by means of a cable 112, including as a part thereof suitable insulated conductors. The cable 112 has a length somewhat in excess of the depth of the bore hole to be explored and is normally wound on a drum 113 to lower the exploring apparatus into the bore hole 109 and may be rewound upon the drum 113 to raise the exploring apparatus.

In order to determine the depth of the exploratory apparatus within the bore hole 109 at any time, there is provided a measuring wheel 114 engaging the cable 112 above the top of the bore hole and adjusted to roll on the cable in such a manner that the number of revolutions of the reel 114 corresponds to the amount of cable which has moved past the reel in either direction. The reel 114 is mounted on a shaft 115, and rotation of the reel and consequently of the shaft 115 is transmitted through a gear box 116 to another shaft 117 which is drivingly connected to take up spool 118 for moving a photographic film 119 from a feed spool 120 to the take up spool 118.

The housing 111 of the exploratory apparatus is divided into three sections designated by numerals 121, 122, and 123, respectively. In the section 121 there is provided a solid support 124 on which is disposed a suitable source of neutrons generally designated as 125, such for example as radium beryllium preparation, which may be enclosed in a container made of a suitable material such as glass. Instead of radium beryllium preparation, the source of neutrons may comprise, for example, a discharge tube adapted to bombard a beryllium or lithium composition with deuterons, thus causing a generation of neutrons in a manner understood by those skilled in the art. This neutron source 125 is enclosed within a jacket 126 made of a material such as lead, which allows the neutron rays to pass completely, or for the greater part therethrough.

The section 122 comprises a scintillation counter consisting of an anthracene crystal 130, and a photomultiplier provided with a suitable voltage supply, the combined photomultiplier and voltage supply being schematically designated by the block 131. It is well known that the anthracene crystal 130 is adapted to convert any incoming radiation such as gamma rays, neutrons, alpha particles, etc., into impulses of light. These impulses of light subsequently impinge upon the photomultiplier 131. The output of the photomultiplier is subsequently amplified in the linear amplifier 132.

The anthracene crystal 130 is directly exposed to a stream of monoenergetic alpha rays emitted by a suitable substance 133 such as polonium adjacent thereto and emitting alpha rays of energy 5.3 m. e. v. Instead of polonium any other suitable source of monoenergetic alpha rays having energy substantially above 2.5 m. e. v. may be used. We may use ionium (isolated from its daughter products) emitting alpha rays of energy 4.66 m. e. v. All the surface of the anthracene crystal except the portion of said surface that is in direct contact with the substance 133 is covered with a thin layer 134 of boron.

The performance of the instrument of Fig. 1 is based essentially upon the collision between the neutrons derived from the source 125 and the target nuclei of various elements contained in the formation adjoining the drill hole. As a result of these collisions three types of radiations are produced at the points of interaction between the neutrons and target nuclei, i. e. gamma rays, fast neutrons, and slow neutrons. The gamma rays are emitted by nuclei that become excited either by a collision or by a capture of a neutron and subsequently return to lower energy state. The fast and slow neutrons result from the collisions between the neutrons derived from the source 125 and the target nuclei of the formations. At each collision a neutron loses a portion of its energy, and therefore if the collision cross section of the target nucleus is large, the collisions are numerous and the energy of the impinging neutrons is progressively degraded until it reaches its "thermal value" of 0.025 e. v. Consequently slow neutrons are produced. On the other hand, if the collision cross section of the target nucleus in the formations is small, the collision is less frequent and consequently the neutrons do not lose their energy very noticeably. Consequently we obtain fast neutrons.

It is therefore apparent that the relative amounts of gamma rays, fast neutrons and slow neutrons produced in the above processes depend upon the chemical nature of various elements in the earth's formations. Thus by separately measuring these three radiations, valuable geological information may be derived concerning the nature of these formations.

The gamma rays and fast neutrons penetrate easily the boron layer 134 and interact with anthracene providing a suitable light impulse which subsequently strikes the photomultiplier 131 and causes electrical impulses to appear in the output of the amplifier 132. The slow neutrons are, however, absorbed by the boron in the layer 134, said boron emitting upon each absorption an alpha ray of an energy about 2.5 m. e. v. This alpha ray subsequently interacts with the anthracene crystal providing a suitable light impulse which subsequently strikes the photomultiplier 131 and causes electrical impulses to appear in the output of the amplifier 132.

It is well known that gamma rays, fast neutrons and slow neutrons do not interact directly with anthracene crystal. The interaction process is indirect and is different for each of these three radiations. Thus an incoming gamma ray interacts with one of the atoms of anthracene and causes ejection of a photoelectron or Compton electron, the energy of said electron being usually of the same order of magnitude as the energy of the incoming gamma ray. An incoming fast neutron strikes one of the nuclei of anthracene, such as nucleus of hydrogen, in which case the nucleus recoils in form of a proton the energy of which is usually of the same order of magnitude as the energy of incoming fast neutron. An incoming slow neutron interacts with the boron layer 134 and causes emission of an alpha particle of an energy approximately 2.5 m. e. v. We obtain thus in each case an emission of an electrically charged particle of a different rest mass. An incoming photon ejects an electron, an incoming fast neutron ejects a proton having a rest mass about 1800 times larger than the electron and an incoming slow neutron ejects an alpha particle having a rest mass about 7200 times larger than the electron. It is well known that the energy of an electrically charged particle that is used to excite the atoms of anthracene is larger, the smaller is the rest mass of the particle. The corresponding impulses of light emitted by anthracene atoms upon their return to the ground state are the most intense for light particles such as electrons, less intense for heavier particles such as protons, and the least intense for the heaviest particles such as alpha rays. Thus the light impulses, and consequently the electrical impulses resulting from these three radiations are substantially in the ratio 9:2:1, i. e. the impulses caused by gamma rays are about 9 times larger than those caused by alpha particles and the impulses caused by fast neutrons are about 2 times larger than those caused by alpha particles. This invention differentiates between these ranges of magnitude for separately detecting gamma rays, fast neutrons, and slow neutrons, respectively.

Figure 6:
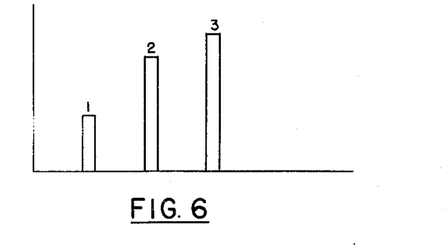
Fig. 6 shows diagrammatically the output of a pulse shaping network.

The output of the amplifier 132 is transmitted to the top of the bore hole through insulated conductors associated with the cable 112. This amplified output consists of a succession of discrete pulses, the magnitudes of which are within three energy ranges that represent gamma rays, fast neutrons, and slow neutrons, respectively. These output pulses are subsequently amplified in the second amplifier 139 located above the opening of the bore hole. The output of the amplifier 139 is connected to a pulse shaping network 140 which is of a standard type and is designed to provide an output voltage for each pulse that will have a rectangular shape and a variable height as shown in Fig. 6, said height representing the magnitude of the impulse. For description of pulse shaping networks see, for instance, the paper on "Counting Rate Meter for Radioactivity Measurements" published in General Radio Experimenter, vol. XXII, No. 2, 3, July–August 1947, pages 1–7. The output terminals of the pulse shaping network are in turn simultaneously applied to five gate elements designated by numerals 141, 142, 143, 144, and 145, respectively. The output of the pulse shaping network 140 consists of a succession of discrete pulses, the magnitude of each pulse serving to identify said pulse, i. e. to determine whether it corresponds to a gamma ray, to a slow neutron, or to a fast neutron. Fig. 4 gives a diagrammatical representation of such an output in which the abscissas represent the time of occurrence of the pulses and the ordinates represent the respective magnitudes of the pulses. The pulses have been designated by consecutive numerals such as 1, 2, 3, etc. These pulses have been subdivided into four energy groups which are designated by Roman numerals I, II, III, and IV.

Group I comprises pulses smaller than a predetermined value $OA_1$ and larger than a predetermined value $OA_2$. In Fig. 4 the pulses belonging to this group are designated as 4 and 8. These pulses correspond to gamma ray photons impinging upon the anthracene crystal 130.

Group II comprises pulses small than a predetermined value $OB_1$ and larger than a predetermined value $OB_2$. In Fig. 4 the pulses belonging to this group are designated as 2, 3, 6, and 10. These pulses correspond to fast neutrons impinging upon the anthracene crystal 130.

Group III comprises pulses having all substantially a predetermined value $OC$. In Fig. 4 the pulses belonging to this group are designated as 1, 5, and 7. These pulses correspond to slow neutrons impinging upon the anthracene crystal 3. More directly they correspond to approximately 2.5 m. e. v. alpha rays resulting from the interaction between slow neutrons and the boron layer 134.

Group IV comprises pulses having all substantially a predetermined value $OD$. These pulses correspond to 5.3 m. e. v. alpha rays emitted by the polonium source 133. In Fig. 4 the pulses belonging to this group are designated as 9 and 11.

The relative ranges of magnitudes of the groups I, II, III, and IV are considerably distorted in Fig. 4 in order to make the graphical presentation clear.

The output pulses as shown in Fig. 4 are simultaneously applied to five gate elements designated by numerals 141, 142, 143, 144, and 145, respectively. Each gate element is characterized by two threshold values, i. e. it is arranged to transmit only those impulses the magnitude of which is below the upper threshold and above the lower threshold.

Thus the gate 141 has an upper threshold determined by the value $OA_1$ and a lower threshold determined by the value $OA_2$. Consequently, this gate 141 transmits only the impulses of the group I. The gate 142 has an upper threshold determined by the value $OB_1$ and a lower threshold determined by the value $OB_2$. Consequently the gate 142 transmits only the impulses of the group II. The gate 143 has an upper threshold that is slightly below the value OC. Consequently the gate 143 transmits only the impulses of the group III. The gate 144 is adapted to transmit signals having magnitude $OD_1$ somewhat smaller than OD, but cannot transmit signals having magnitude OD. Consequently the upper threshold of the gate 144 is slightly above the value $OD_1$ but below the value OD and the lower threshold is slightly below the value $OD_1$. The gate 145 is adapted to transmit signals having magnitude $OD_2$. Consequently the lower threshold of the gate 145 is slightly below the value $OD_2$ but above the value OD and the upper threshold is above the value $OD_2$.

The gates 141, 142, 143, 144, and 145 are provided with control terminals 151, 152, 153, 154, and 155, respectively, that receive corresponding control voltages.

The magnitude of the control voltage applied to the terminals 151 determines the value of the thresholds $OA_1$ and $OA_2$. By increasing (or decreasing) the control voltage the values of the thresholds $OA_1$ and $OA_2$ are increased (or decreased). However, the difference between the values $OA_1$ and $OA_2$ is maintained constant. Consequently the increase (or decrease) of the control voltages causes a shift of the transmitted band of magnitudes upwards toward larger values (or downwards towards smaller values). However, the width of the transmitter band is maintained constant and independent of the variation in the control voltage.

Similarly, the magnitude of the control voltage applied to the terminals 152 (or the control voltage applied to the terminals 153) determines the threshold values $OB_1$, $OB_2$ or the threshold values immediately above or immediately below the value OC. By increasing or decreasing the control voltage applied to terminals 152 (or the control voltage applied to terminals 153) the threshold values $OB_1$, $OB_2$ (or those immediately above and below OC) are correspondingly increased or decreased. However, the difference between these two thresholds is maintained constant and independent of the variation in the control voltage.

The output terminals of the gate elements 141, 142, 143 are connected through leads 156, 157, 158 to galvanometer coils 159, 160, 161, respectively. The galvanometer coils have attached thereto suitable mirrors in a manner well known to those skilled in the art and are adapted to reflect beams of light derived from a source 162, thereby effectively producing on the sensitive film 119 a record comprising three traces designated as 163, 164, 165, respectively, and representing the variations of the voltage applied to the galvanometer coils 159, 160, 161, respectively.

It is thus apparent that the trace 163 represents the neutron-gamma ray log, the trace 164 represents the neutron-fast neutron log, and the trace 165 represents the neutron-slow neutron log.

In order to provide a satisfactory arrangement for producing logs such as designated by 163, 164, and 165 consideration should be given to the temperature dependence of the nuclear detecting instrument. It is well known that the sensitivity of the anthracene crystal 130 decreases with the temperature, i. e. as the temperature of the crystal increases, the amount of light emitted by the crystal (as a result of interaction with an impinging nuclear particle) decreases and the magnitude of the electrical pulse emitted by the photomultiplier 131 becomes smaller.

As the exploring apparatus travels down to various depths in the drill hole it encounters various formations, the temperature of which undergoes some local variations and usually increases with depth. It is thus apparent that in order to compare two measurements performed at different temperatures we should provide an arrangement that compensates for the variation in sensitivity of the anthracene crystal. Such a compensating arrangement includes as one of its essential parts a suitable monoenergetic alpha ray emitter such as polonium 133 placed adjacently to the crystal 130. Under normal temperature conditions we obtain across the output terminals of the network 140 as a result of the radiation from the source 133, uniform electrical impulses having substantially the magnitude OD as shown in Figure 4. These impulses designated as impulses of group IV cannot be transmitted through either of the gates 141, 142, 143. Furthermore, these impulses are too large to be transmitted through the gate 144 and too small to be transmitted through the gate 145. When, however, the temperature of the crystal increases, its sensitivity decreases. Consequently the impulses of the group IV decrease in size and when they reach the magnitude $OD_1$ they pass through the gate 144 and produce a suitable voltage across the output terminals 170 of said gate. On the other hand, when the temperature of the crystal decreases, its sensitivity increases. Consequently the impulses of the group IV increases in size and when they reach the magnitude $OD_2$ they pass through the gate 145 and produce a suitable voltage across the output terminals 171 of said gate.

It is thus apparent that when the sensitivity of the detector decreases we obtain a voltage across the terminals 170 and when the sensitivity increases, we obtain a voltage across the terminals 171. The terminals 170, 171 are respectively applied to excitation windings 172, 173 of a D. C. motor 174, said motor receiving its current supply from a battery 175. The windings 172, 173 are wound in such a manner as to produce two opposing magnetic fluxes. The motor 174 is adapted to displace angularly a rotatable conductive member 175a by means of a shaft 176. When the excitation winding 170 is energized by the voltage output from the gate 144, the member 175a effects an angular displacement in clockwise direction. When, however, the excitation winding 173 is energized by the voltage output from the gate 145, the member 175 effects an angular displacement in anticlockwise direction. One terminal 177 of the member 175 at the point of rotation is connected to a lead 178 and the other terminal 179 is slidingly engaged on a fixed semicircular resistor 180, said resistor having its two terminals 181, 182 connected to a battery 183.

It is apparent that the voltage between the grounded terminals 182 and the lead 178 decreases when the member 175 rotates clockwise and increases when it rotates anticlockwise. This voltage is simultaneously transmitted to the control terminals 151, 152, 153, 154, and 155 of the gates 141, 142, 143, 144, and 145 respectively.

In order to understand the operation of the compensating arrangement, assume that the exploring instrument is exposed to an increase in temperature. Consequently, the sensitivity of the detecting apparatus decreases. The impulses corresponding to gamma rays do not fall any longer within a range of magnitudes $OA_1$, $OA_2$ shown in Fig. 4. They fall within a lower range of magnitudes defined by limits $OA_1^1$ and $OA_2^1$, which are respectively below the corresponding limits $OA_1$ and $OA_2$ as shown in Fig. 4. Similarly, the impulses corresponding to fast and slow neutrons do not fall any more within magnitude ranges $OB_1$ and $OB_2$ and OC, respectively, but within lower ranges of magnitudes defined by limits $OB_1^1$, $OB_2^1$, and by the value $OC^1$, respectively.

It is therefore apparent that when the temperature of the crystal is increased, the gates 141, 142, 143 are not adapted any more to transmit impulses that are caused by gamma rays, fast neutrons and slow neutrons, respectively. It is therefore necessary to modify the transmitting characteristics of the gates 141, 142, and 143, so as to lower the bands of magnitudes from the positions $A_1A_2$; $B_1B_2$; and C to the positions $A_1^1A_2^1$; $B_1^1B_2^1$; and $C^1$. This is effected by means of the control voltage appearing across the output terminals 170 of the gate 144 in the manner hereinabove described. Said control voltage causes the rotation of the shaft 175 in a clockwise direction. It is apparent that as the shaft 175 rotates, the control voltages applied to the terminals 151 to 155 decrease in magnitude and cause a progressive downward shift of the threshold values of the corresponding gates 141 to 145. In particular, the range of magnitudes transmitted through the gate 144 is not any more defined by the magnitude $OD_1$ but by a lower value. Consequently, the impulses corresponding to alpha rays from the polonium source 133 cannot pass any longer through the gate 144. Thus the voltage across the terminals 170 drops to zero and consequently the member 175 stops rotating and reaches a stationary position corresponding to a decrease in the control voltages to the terminals 151, 152, and 153 by a definite amount. This amount is such that the new thresholds corresponding to the gate 141 are not any more $OA_1$, $OA_2$, but $OA_1^1$, $OA_2^1$. The new thresholds corresponding to the gate 142 are not any more $OB_1$, $OB_2$, but $OB_1^1$, $OB_2^1$, and the value transmitted through the gate 143 is not OC but $OC^1$.

It is thus apparent that when the temperature of the crystal increases and its sensitivity correspondingly decreases the thresholds of the gates 141, 142, 143 adjust themselves automatically so that the gate 141 will accept all the impulses originated by gamma rays and the gates 142, 143 will accept all the impulses originated by fast neutrons and slow neutrons, respectively. A similar automatic adjustment, but in the opposite direction, takes place when the temperature of the crystal decreases and its sensitivity correspondingly increases.

Consider now Fig. 5 showing in detail the schematic arrangement of a gate such as one of those designated by numerals 141–145 in Fig. 3. The gate has input terminals 221, output terminals 235 and control terminals 236. The control terminals 236 may be either of those designated by 151–155 in Fig. 3 and the output leads may be either of those designated by 156, 157, 158, 170, 171 in Fig. 3.

The essential element of the gate consists of a band channel comprising two individual channels designated as A and B. The band channel has its input terminals 221, output terminals 252, 266 and control terminals 236. It is arranged to give across its output terminals a D. C. voltage of constant value $V_1$ only when the input signal applied to terminals 221 is contained within a predetermined range of magnitudes constituting the transmission band. This range of magnitudes is fixed by the control voltage applied to the terminals 236. That is, with a certain setting for the control voltage the circuit will be responsive only to input voltages within a predetermined band. If the input voltage is outside the band no output will be produced.

Assume now that $n$ impulses having magnitudes within the transmission band entered at the input terminals 221. These impulses produce across the terminals 252, 266 $n$ voltage impulses having uniform value $V_1$, each of said voltage impulses having a very short but constant duration. By integrating these impulses per unit of time we obtain a value representing the relative occurrence of impulses within said predetermined band. This is effected by applying the output terminals 252, 266 to an integrator comprised within the dotted block 229 which will produce across its output terminals 231 a voltage representing the frequency of occurrence of said impulses. This voltage amplified in the amplifier 291 is applied to the output terminals 235. The channel A comprised within the band channel has input terminals 221 and output terminals 252, 253. One of the input terminals is connected through the resistor 254 to the grid 255 of a triode 256, said triode having its cathode 257 connected in series with a biasing battery 258 and with a control voltage applied to the control terminals 236. The plate 260 of the triode is connected through the output terminal 252, resistor 261 to the output terminal 253 and then through the battery 262 to ground.

The channel B comprised within the band channel has input terminals 221 and output terminals 253, 266. One of the input terminals is connected through the resistor 267 to the grid 268 of a triode 269, said triode having its cathode 270 connected in series with a biasing battery 271 and with a control voltage applied to the control terminals 236. The plate 272 of the triode is connected through the output terminal 266, resistor 274 to the output terminals 253 and then through the battery 262 to ground.

It is apparent that we obtain across the output terminals 252, 253 only those impulses that are capable of overcoming the biasing voltage of the tube 256. Assume that the voltage of the battery 258 is $E_1$ and that the voltage applied to the control terminals 236 is $E_2$. Then the total biasing voltage is $E_1+E_c$. Therefore, only the impulses that are capable of exceeding the threshold value provided by the total biasing voltage are transmitted through the channel A and appear across the output terminals 252, 253.

Similarly, in the channel B only those voltages appear across the output terminals 266, 253 that are capable of overcoming the biasing voltage of the tube 269. Assume that the voltage of the battery 271 is $E_2$. Then the total biasing voltage of the tube 269 is $E_2+E_c$. Consequently, only those impulses that are capable of exceeding the threshold value $E_2+E_c$ appear across the terminals 266, 253.

The two output voltages across the terminals 252, 253 and 266, 253 are mounted in opposition, so that the resultant output between the terminals 252, 266 is equal to their difference. Consider now three cases designated as $(a)$, $(b)$, and $(c)$.

Case $(a)$: The impulse applied to the terminals 221 has a value below the threshold voltages of the tubes 256 and 269. Consequently, no plate currents will be delivered by these tubes and no voltage will appear across the terminals 252, 266.

Case $(b)$: The impulse applied to the terminals 221 has a value above the threshold voltages of the tubes 256 and 269. Consequently, both tubes deliver plate currents, and two short voltage impulses appear simultaneously across the output terminals 252, 253 and 266, 253. Since these two voltages are equal one to another, the resultant voltage across the terminals 252, 266 is zero.

Case $(c)$: The impulse applied to the terminals 221 has a value smaller than the threshold of the tube 269, i. e. smaller than $E_2+E_c$ and larger than the threshold of the tube 256, i. e. larger than $E_1+E_c$. Consequently, a plate current will pass through the tube 256 and no plate current will pass through the tube 269. Consequently, no voltage will be produced across the terminals 266, 253 and a short voltage impulse will appear across the terminals 252, 253. We obtain, therefore, across the terminals 266, 252 a resultant voltage coincident with the impulse applied to the terminals 221.

It is thus apparent that at any instant only those impulses that are comprised within the range limited by the value $E_1+E_c$ and $E_2+E_c$ produce corresponding output impulses across the terminals 266, 252.

The output impulses derived from terminals 266, 252 are applied to an integrating network 229 comprising series resistors 280, 282 and a shunt condenser 281. This network is adapted to translate the voltage applied across its input terminals 252, 266 into an output voltage across the terminals 231 that represents the time integral of the input voltage. Each impulse comprised within the two threshold values that arrive at the terminals 221 corresponds to an output voltage across terminals 252, 266, said output voltage having a fixed value $V_1$ and a fixed duration $\Delta t$. Consequently, we obtain across the output terminals 131 of the integrator a voltage having value $\epsilon V_1 \Delta t$ that represents the number of impulses per unit of time comprised within the range limited by value $E_2+E_c$ and $E_1+E_c$. The voltage derived from the terminals 231 is applied through an amplifier 291 to the output terminals 235.

If we refer now to the gate 141 at normal temperature, then the value $E_2+E_c$ corresponds to the upper threshold $OA_1$, the value $E_1+E_2$ corresponds to the lower threshold $OA_2$. If the temperature increases then the control voltage applied to the terminals 141 decreases by an amount $\Delta E_c$ and assumes a new value $E_c - \Delta E_c$. Then the upper threshold assumes a new value $OA_1^1$ corresponding to $E_2+E_c-\Delta E_c$ and the lower threshold assumes a new value $OA_2^1$ corresponding to $E_1+E_c-\Delta E_c$. It is apparent that the width of the transmitted band is determined by $E_2-E_1$ and is independent of the value of the control voltage. When the control voltage increases the band is shifted upwards; when it decreases, the band is shifted downward.

Similar relationships hold for all the remaining gates 142–145. It should be noted that at normal temperature the gates 143, 144, 145 admit very narrow bands comprising the magnitudes $OC_1$, $OD_1$, and $OD_2$, respectively. Thus in case of the gate 143 the value $E_2+E_c$ corresponds to value slightly above $OC$, the value $E_1+E_c$ corresponds to a value slightly below $OC$ and the width $E_2-E_1$ is relatively small. When the temperature increases the band is lowered but maintains its width. The new limits correspond to values $E_2+E_c-\Delta E$, $E_1-\Delta E$ and the new position of the band includes the value $OC^1$. Similar relationship held for gates 144 and 145.

While I have described my invention in connection with certain specific embodiments thereof, it is to be understood that this is by way of illustration and not by way of limitation and I do not mean to be bound thereby but only to the scope of the appended claims which should be construed as broadly as the prior art will permit.

I claim:

1. Apparatus for analyzing heterogeneous radiation having a plurality of distinct components, comprising a radiation-sensitive element, means coupled thereto operative to produce a train of electric pulses responsively to impingement of said radiation on said sensitive element, the pulses from each component of radiation having a characteristic distinct range of magnitudes, a source of substantially monoenergetic radiation mounted near said sensitive element for impingement of its radiation thereon, the pulses produced by said pulse-producing means responsively to such monoenergetic radiation being distinct in magnitude from the pulses produced responsively to the types of radiation to be analyzed, a plurality of gate elements mutually fed by said pulse-producing means, each of said gate elements being responsive only to pulses having magnitudes lying within an upper limit and a lower limit, said upper and lower limits defining the transmission band of such gate element, the respective transmission bands of the gate elements being so selected that the pulses from each component of radiation to be analyzed fall within the transmission band of at least one gate element, and means coupled to the pulse-producing means operative responsively to changes in the magnitude of the pulses derived from said monoenergetic radiation to shift simultaneously the upper and lower limits of said transmission bands of all said gate elements without substantially affecting the widths of said transmission bands or their relationships to one another.

2. Apparatus for analyzing heterogeneous radiation having a plurality of distinct components, comprising a radiation-sensitive element, means coupled thereto operative to produce a train of electric pulses responsively to impingement of said radiation on said sensitive element, the pulses from each component of radiation having a characteristic distinct range of magnitudes, a source of substantially monoenergetic radiation mounted near said sensitive element for impingement of its radiation thereon, the pulses produced by said pulse-producing means responsively to such monoenergetic radiation being distinct in magnitude from the pulses produced responsively to the types of radiation to be analyzed, a plurality of gate elements mutually fed by said pulse-producing means, each of said gate elements being responsive only to pulses having magnitudes lying within an upper limit and a lower limit, said upper and lower limits defining the transmission band of such gate element, the respective transmission bands of the gate elements being so selected that the pulses from each component of radiation to be analyzed fall within the transmission band of at least one gate element, and means coupled to the pulse-producing means operative responsively to changes in the magnitude of the pulses derived from said monoenergetic radiation to increase simultaneously and substantially equally the upper and lower limits of the transmission bands of all said gate elements when the magnitude of the pulses derived from said monoenergetic radiation increases, and similarly to decrease said upper and lower limits when said last-mentioned magnitude decreases.

3. Apparatus for analyzing heterogeneous radiation having a plurality of distinct components, comprising a radiation-sensitive element, means coupled thereto operative to produce a train of electric pulses responsively to impingement of said radiation on said sensitive element, the pulses from each component of radiation having a characteristic distinct range of magnitudes, a source of substantially monoenergetic radiation mounted near said sensitive element for impingement of its radiation thereon, the pulses produced by said pulse-producing means responsively to such monoenergetic radiation being distinct in magnitude from the pulses produced responsively to the types of radiation to be analyzed, a plurality of gate elements mutually fed by said pulse-producing means, each of said gate elements being responsive only to pulses having magnitudes lying within an upper limit and a lower limit, said upper and lower limits defining the transmission band of such gate element, the respective transmission bands of the gate elements being so selected that the pulses from each component of radiation to be analyzed fall within the transmission band of at least one gate element, a pair of auxiliary gate elements having transmission bands respectively above and below the normal magnitude of the pulses derived from said monoenergetic radiation, and servo means controlled by said auxiliary gates and coupled to all of said first-mentioned gate elements operative responsively to unlike output pulses from said auxiliary gates to shift the upper and lower limits of the transmission bands of all said gate elements without substantially altering the widths of said transmission bands or their relationships to one another.

4. In an apparatus for analyzing a train of electric pulses differing in magnitude within wide limits, a gate circuit for passing pulses having magnitudes within a narrow range of values and rejecting all other pulses, comprising a pair of electron discharge devices, each of said discharge devices having a cathode, a control element, and an anode, a common anode current source for said discharge devices, a separate anode impedance for each of said discharge devices, said impedances being connected in series between one of said anodes and the other said anode, circuit means connecting said current source between ground and the junction of said impedances, pulse-input means comprising two terminals, resistance means connecting one of said terminals to said control elements, whereby pulses applied to said input means are transmitted in like phase to both of said control elements, circuit means connecting the other of said input terminals respectively to said cathodes, the control-element cathode circuits of each of said electron discharge devices respectively including therein sources of bias voltage, said respective voltages being chosen to give said discharge devices unlike conduction characteristics, whereby, within a limited range of control-element potentials, one of said discharge devices will conduct more current than the other, and output means coupled to said respective anodes and arranged to provide an output signal proportional to the difference between the potentials on said anodes.

5. Apparatus according to claim 4 wherein said control-element cathode circuits are provided with a common portion containing an auxiliary bias-potential source, and having also means for varying the voltage supplied by said last-mentioned source for changing the range of pulse magnitudes transmitted by said gate circuit without substantially affecting the width of such range.

6. In a radiation-analyzing system, the combination comprising a counter operative to provide output pulses responsively to radiation impinging thereon, the amplitude of such pulses varying in accordance with the energy of such radiation, a pilot source mounted adjacent said counter and emitting radiation of known character, an output network for said counter for selectively transmitting output pulses having amplitudes lying between an upper limit and a lower limit, and means selectively responsive to the radiation from said pilot source for shifting said limits, whereby said radiation-analyzing system is held in calibration despite changes in the sensitivity of said counter.

7. In a radiation-analyzing system, the combination which comprises a radiation counter producing output pulses related in amplitude to the energy of radiation quanta intercepted, a variable discriminating network connected to the output of said counter for selectively transmitting output signals therefrom lying within a limited amplitude range, means selectively responsive to radiations of a predetermined energy level normally operative to produce pulses lying outside said limited amplitude range, and control means for said discriminating network operative responsively to said last-mentioned means for shifting said range to compensate for changes in the sensitivity of said counter.

8. In a radiation-analyzing system of the type producing output pulses related in magnitude to the energy levels of radiation quanta intercepted, the method of stabilizing such system which comprises the steps of selectively detecting radiation from a source of known characteristics, deriving output pulses therefrom, and using such output pulses to control the response range of the analyzing system to maintain substantially constant the energy range of radiation indicated at the system output notwithstanding changes in the transmission characteristics of the system.

9. In combination with a radiation detector of variable spectral selectivity, control means selectively responsive to radiation of a predetermined energy level, regulating means for varying the spectral-response characteristics of said detector, and means coupling said control means to said regulating means operative to maintain said detector responsive to said radiation of predetermined energy level so long as such radiation is being intercepted, notwithstanding intervening detector drift.

10. In a radiation-analyzing system, the combination which comprises a proportional counter, a pilot source mounted adjacent said counter and emitting radiation of known character, a variable discriminating network connected to the output of said counter for selectively transmitting output signals therefrom within a limited amplitude range, and means selectively responsive to radiations from said pilot source and coupled to said discriminating network for shifting said range in response to changes in the sensitivity of said counter.

11. In combination with a radiation detector of variable spectral selectivity, a pilot source emitting radiation of known character adjacent said detector and means selectively responsive to such pilot-source radiation for varying the selectivity of said detector.

12. The method of calibrating a proportional radiation analyzer for the analysis of incoming unknown radiation within a predetermined energy range comprising the steps of irradiating the counter with a pilot radiation of known energy lying outside said predetermined energy range, adjusting the analyzer output in response to said pilot radiation to place the detection limits of said analyzer to said unknown radiation at the bounds of said desired energy range, monitoring the response of said analyzer to said pilot radiation during analysis of said incoming unknown radiation to reveal sensitivity changes in said analyzer as they may occur, and readjusting said analyzer to compensate for such changes.

13. The method of calibrating a proportional radiation analyzer for the analysis within a predetermined energy range of a radiation field comprising unknown components of different energy levels and including at least one component of known energy, comprising the steps of selectively detecting said known radiation component and deriving thereby a signal characteristic thereof, adjusting the analyzer in response to said signal to place the detection limits of said analyzer at the bounds of said desired energy range, monitoring the response of said analyzer to said known radiation component during analysis of said radiation field to reveal sensitivity changes in said analyzer as they may occur, and readjusting said analyzer to compensate for said changes.

14. The method of stabilizing a radiation analyzer for the analysis of a radiation field comprising components of different energy levels, said analyzer being of the type which produces electric pulses related in amplitude to the energy of the detected rays, which comprises the steps of selectively detecting the pulses corresponding to rays of a particular energy level and deriving thereby a signal characteristic thereof, monitoring said signal during operation of said analyzer to reveal sensitivity changes in said analyzer as they may occur, and shifting the response characteristics of said analyzer responsively to variations in said signal to compensate for said sensitivity changes.

15. In a system for making a spectral analysis of a radiation field comprising rays of different energy levels but including at least one group of rays of known energy, the combination which comprises a radiation detector operative to produce output pulses related in amplitude to the energy of the detected rays, a variable discriminating network connected to the output of said detector for selectively transmitting pulses lying within a limited amplitude range, stabilizing means fed by said detector and selectively responsive to the pulses characteristic of one of said groups of rays of known energy, said stabilizing means being operative to produce an output voltage representative of the absolute amplitude of said last-mentioned pulses, and control means for said discriminating network operative responsively to changes in said output voltage to shift the characteristics of said discriminating network to compensate for changes in the sensitivity of said detector.

16. In a system for making a spectral analysis of a radiation field comprising rays of different energy levels but including at least one group of rays of known energy, the combination which comprises a radiation detector operative to produce output pulses related in amplitude to the energy of the detected rays, a variable discriminating network connected to the output of said detector for selectively transmitting pulses lying within a limited amplitude range, stabilizing means fed by said detector and selectively responsive to the pulses characteristic of one of said groups of rays of known energy, said stabilizing means being operative to produce an output voltage representative of the absolute amplitude of said last-mentioned pulses, and control means operative to shift the characteristics of said discriminating network and of said stabilizing means responsively to changes in said output voltage for compensating the effects of changes in the sensitivity of said detector.

References Cited in the file of this patent

UNITED STATES PATENTS

| | | |
|---|---|---|
| 2,158,261 | Urtel et al. | May 16, 1939 |
| 2,249,420 | Engbert | July 15, 1941 |
| 2,293,528 | Barco et al. | Aug. 18, 1942 |
| 2,469,460 | Fearon | May 10, 1949 |
| 2,469,463 | Russell | May 10, 1949 |
| 2,496,909 | Eberhard | Feb. 7, 1950 |
| 2,532,347 | Stodola | Dec. 5, 1950 |

OTHER REFERENCES

"Electronic Classifying, Cataloguing and Counting Systems," Parsons AECD 1827, March 25, 1948, pgs. 1–5.